United States Patent Office 3,099,598
Patented July 30, 1963

3,099,598
WOOD PRESERVATIVE
Lars G. Birkner, Danderyd, and Sten Tycho Henriksson, Skelleftehamn, Sweden, assignors to Bolidens Gruvaktiebolag, Stockholm, Sweden, a joint-stock limited company of Sweden
No Drawing. Filed Sept. 5, 1961, Ser. No. 135,774
Claims priority, application Sweden Sept. 9, 1960
2 Claims. (Cl. 167—38.5)

This invention relates to a wood preservative in a concentrated form adapted to be applied as such or after dilution with water on and/or in wood, providing after diffusion into the wood by a fixation process, in which insoluble salts are precipitated in the wood, an impregnation resistant to leaching.

In impregnating wood to preserve same against attacks of wood destroyers it is known to treat the wood with aqueous solutions, dispersions or pasty preparations of various inorganic compounds of, for instance, arsenic, chromium, fluorine, boron, copper, zinc and others. These compounds mostly are present as water-soluble salts capable of penetrating the capillaries of the wood. After absorption in the wood one or more of the water-soluble salts by reaction with each other and/or with organic substances present in the wood are transformed into water-insoluble salts which are precipitated ("fixed") in the wood and thereby exert their preserving action for a long time without being leached out by any water that may be present.

Most of the water-soluble wood impregnation preparations are marketed in a concentrated form such as mixtures of solid salts or aqueous pastes which may have been stabilized or homogenized by means of thickeners such as aqueous cellulose derivatives, as well as in the form of cartridges of a solid or plastic consistency.

Such prior compositions are suffering from many disadvantages. In a wood preservative of the so-called fixing type it may happen that the salt components which are intended only after dissolution of the preparation in water and absorption in the wood to react with each other or with substances present in the wood to form insoluble compounds, are reacting with each other or possible other constituents of the composition (e.g. thickeners) already during the storage of the preparation, possibly also under the influence of the carbonic acid of the air, exterior moisture or water of crystallization present so that the compounds thus precipitated cannot longer penetrate the wood.

In diffusion impregnation methods the endeavour always has been by simple means to apply the impregnating substances at the highest possible concentration. To this end there has been previously suggested to use as concentrated solutions as possible of the impregnating substances such as borax and boric acid. Since, however, it is normally not possible to prepare solutions having a concentration of more than 50% trials were made to solve the problem by using pasty preparations or even solid substances. However, to maintain their ability to diffuse such pasty or solid substances have first to be dissolved by the moisture present in the wood and in absence or deficiency of such moisture the salts will remain on the surface and may be rinsed away by rain without having had a sufficient period of time to penetrate the wood.

Another disadvantage of this diffusion impregnation is the difficulty in connection with the application proper. A paste used for the present comprises a heavy paste of solid salts which has to be puttied or spread out over the timber by means of spades or be diluted with water to be subsequently sprayed or applied by means of a brush or the like. It has proved difficult, however to dilute such a paste to a suitable and homogeneous coating consistency, and as a result thereof the workers frequently add water in excess resulting in a mixture which is by no means suitable for the purpose but splashes during the application and flows off the timber without being absorbed thereof. Due to the presence of the solid salts it has also provided to be impossible to apply the paste by means of spraying apparatus, even if said paste is diluted with water. A further disadvantage of prior powder mixtures of solid impregnation salts is the difficulty to obtain a homogeneous distribution of the constituents of the inhomogeneous paste which renders the calculated fixation in the wood difficult or impossible.

According to a further impregnation method, which is also based on the diffusion of the impregnation salts, the impregnating preparation is inserted as solid cartridges into bores drilled in the timber to be impregnated such as sleepers and poles, and diffuses into the wood from the bores. The use of solid cartridges is unfavourable and time-consuming, since the solid salts have to be compressed into cartridges of the desired diameter, said cartridges falling easily to pieces during transport and storage. On inserting the cartridges into the bores a relatively large amount of the cartridges is wasted, and in addition to that the cartridges and the crushed fragments thereof, respectively, which are frequently filling the bores insufficiently, only to an insufficient degree or at a great delay penetrate the wood since only the parts of the cartridges contacting the wood are able to diffuse. Since the rate of diffusion is a function of the moisture content of the wood it may even happen that the salts of the cartridges do not at all diffuse into the wood. In such instances—especially in the case of an after-treatment of sleepers—the cartridges not dissolved impede the subsequent plugging of the bores which is always effected after such an impregnation.

Despite previous efforts there has thus not heretofore been developed any wood impregnation preparation which fulfills the requirements as to easiness of handling and application, good hiding power, shelf life and solubility in water at a high concentration.

An example of a diffusion and fixation type wood impregnating preparation comprises a solid salt mixture containing 20% $As_2O_5$, 26% $CrO_3$ 24% $Na_2O$, and 20% $H_2O$ in the form of water of crystallization. The aqueous solution of this preparation concentrated at normal outdoor temperatures is maximum about 50%, i.e. a concentration which is at times insufficient to obtain through the diffusion impregnation process an effective preservation action, for which reason to obtain an effective impregnation the solid preparation has to be stirred up with water to a slurry or suspension of solid salts with the resulting accompanying disadvantages.

According to the present invention it has now surprisingly been found that by incorporating into a preparation of the general composition stated above, boron compounds in a balanced amount, it is possible to obtain a solid salt mixture having excellent wood impregnation properties and which on dilution with water in an amount only as little as about 5% will form a viscous, clear solution mixible with water in any proportions.

The wood impregnation preparation according to the present invention is characterized in that it contains as wood preserving components 20–35, preferably 23–27% by weight $As_2O_5$, 15–35, preferably 18–24% by weight $CrO_3$, and 5–30, preferably 8–15% by weight $B_2O_3$, and the remainder $Na_2O$ and water of crystallization.

A preferred composition of the wood impregnation preparation according to the invention is the following, expressed in percent by weight:

| | Percent by weight |
|---|---|
| $As_2O_5$ | 25 |
| $CrO_3$ | 22 |
| $B_2O_3$ | 11 |
| $Na_2O$ | 18 |
| $H_2O$ (water of crystallization) | 24 |
| | 100 |

On dilution of this solid salt mixture with water in an an amount to give a total content of about 30% inclusive the water of crystallization, a yellow-brown clear syrupy liquid is formed the viscosity of which is approximately 9000 centipoises at 25° C. Already on addition of a minor further quantity of water corresponding to an increase of the total water content (inclusive the water of crystallization) to 31%, the viscosity is lowered by more than the half and is more exactly determined to approximately 4000 centipoises at 25° C. Thus, by merely a very slight dilution of the preparation it is possible within wide limits to vary the viscosity and adjust it to a consistency required for the actual application method, and nevertheless a liquid wood impregnation preparation of the high concentration desired for a diffusion impregnation is available. Due to the fact that despite its high concentration—approximately 90 to 95% of solid salts—the impregnation composition exists in the form of a solution without any dispersed solid particles whatsoever, the application of the preparation on to the timber to be impregnated is extraordinarily simple. An especially well suited application method is by means of a spray apparatus but also application by means of a brush or—which has proved to be suitable in practice—by means of a long-shafted short-bristle brush or roller (for instance in impregnation of sleepers) has proved to be very easy to perform. The application by means of a spray gun does not create any risk of the nozzle being clogged.

Since the concentrated solution is void of solid particles it may penetrate the wood rapidly even if the moisture content thereof is too low to allow any appreciable diffusion. Accordingly, there is no risk for the paste to remain on the surface of the dry timber and afterwards to be rinsed away by rain.

Having now described the invention, what we claim as new and desire to secure by Letters Patent, is:

1. A wood impregnation preparation in the form of a concentrated liquid composition which may be diluted with water comprising 23–27% $As_2O_5$, 18–24% $CrO_3$, and 8–15% $B_2O_3$, and the remainder $Na_2O$ and water, including water of crystallization.

2. A wood impregnation preparation, comprising a stable homogeneous aqueous solution of the composition 23% $As_2O_5$, 20% $CrO_3$, 10% $B_2O_3$, 17% $Na_2O$, and 30% $H_2O$.

References Cited in the file of this patent

UNITED STATES PATENTS

| | | |
|---|---|---|
| 2,599,373 | Chrzanowski | June 3, 1953 |
| 2,852,428 | Cook | Sept. 16, 1958 |
| 3,007,844 | Schulz | Nov. 7, 1961 |